(12) United States Patent
Hoffman et al.

(10) Patent No.: US 7,322,172 B2
(45) Date of Patent: Jan. 29, 2008

(54) UTENSIL WRAPPING APPARATUS AND METHOD

(75) Inventors: Gerald T. Hoffman, Fort Wayne, IN (US); Glen T. Lindahl, Churubusco, IN (US)

(73) Assignee: Wrapmaster, Inc., Fort Wayne, IN (US)

( * ) Notice: Subject to any disclaimer, the term of this patent is extended or adjusted under 35 U.S.C. 154(b) by 0 days.

(21) Appl. No.: 11/439,662

(22) Filed: May 24, 2006

(65) Prior Publication Data
US 2007/0271879 A1 Nov. 29, 2007

(51) Int. Cl.
*B65B 11/00* (2006.01)
(52) U.S. Cl. ............................ 53/586; 53/155; 53/203; 53/206; 53/582
(58) Field of Classification Search ............... 53/425, 53/430, 461, 465, 466, 116, 117, 118, 154, 53/155, 167, 203, 206, 209, 211, 216, 218, 53/228, 199, 582, 586, 587, 589, 137.2, 399
See application file for complete search history.

(56) References Cited

U.S. PATENT DOCUMENTS

| | | | |
|---|---|---|---|
| 5,237,801 A | 8/1993 | Hillam et al. | |
| 5,469,688 A | 11/1995 | Dunbar et al. | |
| 6,023,908 A | 2/2000 | Vetsch | |
| 6,023,913 A | 2/2000 | Gray et al. | |
| 6,202,387 B1 * | 3/2001 | Brown et al. | 53/137.2 |
| 6,615,566 B2 | 9/2003 | Heisey | |
| 6,837,028 B1 | 1/2005 | Miano et al. | |
| 6,918,226 B2 | 7/2005 | Heilman et al. | |
| 6,971,218 B1 * | 12/2005 | Huckaba et al. | 53/399 |
| 6,976,348 B1 | 12/2005 | Miano et al. | |
| 7,210,279 B1 * | 5/2007 | Ahmed et al. | 53/216 |
| 2002/0112445 A1 | 8/2002 | Scaduto | |
| 2004/0237475 A1 * | 12/2004 | Rubin | 53/461 |
| 2005/0000191 A1 | 1/2005 | Heilman et al. | |
| 2005/0166548 A1 | 8/2005 | Lavi | |

* cited by examiner

*Primary Examiner*—Louis Huynh
(74) *Attorney, Agent, or Firm*—Barnes & Thornburg LLP

(57) ABSTRACT

An apparatus and method for wrapping a napkin around one or more utensils. The apparatus includes a wrapping area defining a trough dimensioned to receive one or more utensils. A utensil dispenser and napkin delivery mechanism may be provided to deliver the utensils and a napkin, respectively, to the trough. The apparatus may also include a wrapping mechanism that wraps the napkin around the utensils. In some cases, a tension mechanism may be included to selectively limit movement of the napkin during wrapping.

50 Claims, 8 Drawing Sheets

UTENSIL WRAPPING APPARATUS AND METHOD

TECHNICAL FIELD

This invention relates to devices and methods for wrapping a napkin around one or more utensils, such as spoons, forks and/or knives.

BACKGROUND

Many establishments that serve food, such as restaurants, cruise lines, banquet facilities, hospitals, nursing homes, and airlines, provide patrons with utensils in bundled form, that is, one or more utensils wrapped inside a napkin. The bundles are provided in an attempt to reduce the time needed to distribute the utensils. In addition, the bundles aid in reducing patron handling of the utensils during distribution, thereby reducing contamination.

The bundles are typically formed manually, which has several drawbacks. For example, many restaurant employees spend significant amounts of time wrapping the utensils. The labor costs associated with wrapping utensils can significantly impact the operational costs of restaurants and other food service establishments. There is also a risk of contamination during the wrapping process. For example, employees handling of the utensils during wrapping may cause contamination.

There have been attempts to automate the wrapping process. However, the devices that have been devised tend to be large and bulky, which are unsuitable for many kitchens where space is at a premium. Moreover, these devices require handling of the utensils to load the device, which increases the risk of contamination.

SUMMARY

An apparatus for wrapping a napkin around one or more utensils in accordance with one aspect of the invention comprises a wrapping area defining a trough that is dimensioned to receive one or more utensils. The apparatus may include a utensil dispenser and a napkin delivery mechanism that are configured to deliver utensils and napkins, respectively, to the trough. A wrapping mechanism may be provided that is configured to wrap the napkin around the utensils to define a wrapped bundle. The apparatus may also include a tension mechanism configured to selectively limit movement of the napkin during wrapping of the napkin around the utensils.

In some exemplary embodiments, the tension mechanism may be configured to frictionally engage a portion of the napkin during wrapping. For example, the tension mechanism may engage a portion of the napkin proximate an edge of the trough. Typically, the tension mechanism engages a portion of the napkin prior to the wrapping mechanism starting to wrap the napkin. In some cases, the tension mechanism will stop frictional engagement of the napkin at some time after the wrapping mechanism starts wrapping, but before the wrapping mechanism completes wrapping the napkin.

The apparatus may be constructed such that the tension mechanism moves between a first position and a second position. In some such cases, the tension mechanism may limit movement of the napkin in the first position while not limiting movement of the napkin in the second position. For example, the tension mechanism may trap a portion of the napkin between the tension mechanism and the wrapping area in the first position. In some cases, the tension mechanism may rotate between the first position and the second position. Alternatively, the tension mechanism may move linearly between the first position and the second position. Depending on the exigencies of a particular application, the tension mechanism may be synchronized with the wrapping mechanism such that the tension mechanism moves to the first position prior to the wrapping mechanism starting to wrap the napkin around the utensils. In some such embodiments, the tension mechanism may move to the second position at some time after the wrapping mechanism starts wrapping the napkin, but before the wrapping mechanism completes wrapping of the napkin.

In some exemplary embodiments, the tension mechanism may include an adhesive dispenser that is configured to deposit an adhesive on the napkin. For example, the tension mechanism may be configured to deposit the adhesive on the napkin when the tension mechanism is in the first position. In some cases, the tension mechanism may include a tape dispenser that is configured to place a piece of tape on the napkin. In some such cases, the tension mechanism may be configured to place the piece of tape on the napkin when the tension mechanism is in the first position.

The apparatus may be constructed such that the wrapping mechanism may include a rod portion that extends into the trough. For example, the wrapping mechanism may include an actuator configured to rotate the rod portion about its longitudinal axis. In some cases, the rod portion may be approximately longitudinally aligned with the trough.

In some embodiments, the apparatus may include a discharge mechanism that is configured to remove the wrapped bundle from the wrapping mechanism. For example, the discharge mechanism may travel between a first position and a second position along an axis that is substantially parallel to a longitudinal axis of the wrapping mechanism's rod portion.

In some exemplary embodiments, the napkin delivery mechanism may include a transfer arm configured to rotate between a first position proximate a stack of napkins and a second position proximate the trough. For example, the transfer arm may include a vacuum lifting portion configured to lift a napkin from the stack of napkins.

Depending on the exigencies of a particular application, the utensil dispenser may include a magazine with an interior dimensioned to receive a stack of utensils. In some cases, the magazine may be selectively detachable from the utensil dispenser. The magazine may be constructed to include a liquid penetrable area that allows liquid communication with the interior substantially along the entire length of the magazine. In some such cases, a separation device may be carried by the magazine, which defines a plurality of spaces in the interior of the magazine that are each dimensioned to receive a utensil. For example, the separation device may include a first portion external to the interior of the magazine and a second portion that extends into the interior of the magazine.

Other aspects of the invention are achieved by an apparatus for wrapping a napkin around one or more utensils comprising a wrapping area defining a trough dimensioned to receive one or more utensils. A utensil dispenser and napkin delivery mechanism may be provided to deliver one or more utensils and a napkin, respectively, to the trough. The apparatus may include a wrapping mechanism configured to wrap the napkin around the utensils to define a wrapped bundle. The apparatus may also include means for frictionally engaging a portion of the napkin to selectively limit movement of the napkin when the wrapping mechanism is wrapping the napkin around the utensils. The frictionally engaging means may be synchronized with the wrapping mechanism such that the frictionally engaging means engages the napkin prior to the wrapping mechanism starting to wrap the napkin. The frictionally engaging means may also disengage the napkin at some time after the wrapping mechanism starts wrapping the napkin, but before the wrapping mechanism completes wrapping the napkin.

For some embodiments, the frictionally engaging means may include a tape dispenser that is configured to place a piece of tape on the napkin. Embodiments are also contemplated in which the napkin delivery mechanism includes a transfer arm that rotates between a first position proximate a stack of napkins and a second position proximate the trough. In some exemplary embodiments, the transfer arm may include a vacuum lifting portion configured to lift a napkin from the stack of napkins.

In some embodiments, the utensil dispenser may include a magazine with an interior dimensioned to receive a stack of utensils. Often, the apparatus may include a separation device configured to be carried by the magazine. For example, the separation device may divide the interior of the magazine into a plurality of spaces that are each dimensioned to receive a utensil. Preferably, the separation device is selectively removable from the magazine. Some embodiments contemplate the magazine including a liquid penetrable portion to allow liquid communication with the interior of the magazine. In such embodiments, the liquid penetrable portion may be configured to allow sufficient liquid communication with the interior of the magazine to clean utensils carried therein.

Still further aspects of the invention are achieved by a method of wrapping a napkin around one or more utensils. One step in the method involves delivering a napkin to a wrapping area. Another step involves delivering a utensil onto the napkin, such that the napkin includes a first portion adjacent a first side of the utensil and a second portion adjacent a second side of the utensil. The napkin may be wrapped around the utensil by initially engaging the first portion of the napkin. The movement of the napkin's second portion is limited during wrapping of the napkin.

Additional aspects of the invention are achieved by a method of loading a napkin wrapping apparatus with one or more utensils. The method involves the step of providing a magazine defining an interior that is dimensioned to receive a stack of utensils. The magazine may include a liquid penetrable portion to allow liquid communication with the magazine's interior. The magazine is loaded with a plurality of utensils. Another step in the method involves placing the magazine into a dish washing machine. The dish washing machine is activated to clean the utensils. The magazine is inserted into a napkin wrapping apparatus without touching the utensils.

Embodiments are contemplated in which a separation device may be associated with the magazine. For example, the separation device may define a plurality of spaces in the interior that are each dimensioned to receive a utensil. In some exemplary embodiments, the method involves removing the separation device from the magazine without touching the utensils. For example, the separation device may include a first portion external to the magazine's interior and a second portion that extends into the interior of the magazine. In some such embodiments, the separation device is removed from the magazine by engaging the first portion of the separation device.

Additional aspects of the invention are achieved by an apparatus for wrapping a napkin around one or more utensils. The apparatus may include a wrapping area that defines a trough dimensioned to receive one or more utensils. A utensil dispenser may be provided to deliver one or more utensils to the trough. The apparatus may also include a transfer arm that is configured to deliver a napkin to the trough. For example, the transfer arm may rotate between a first position proximate a stack of napkins and a second position proximate the trough. A wrapping mechanism may also be provided that is configured to wrap the napkin around the utensils.

In some exemplary embodiments, the transfer arm includes a vacuum lifting portion that is configured to lift a napkin from the stack of napkins. Some embodiments contemplate the transfer arm rotating about an approximately perpendicular axis to a longitudinal axis of the trough. In some cases, the transfer arm may rotate about an approximately vertical axis. Preferably, the transfer arm has a limited rotational movement of less than approximately 180 degrees.

In another aspect, the invention provides an apparatus for wrapping a napkin around one or more utensils. The apparatus includes a wrapping area defining a trough that is dimensioned to receive one or more utensils. A utensil dispenser and napkin delivery mechanism may be provided to deliver utensils and napkins, respectively, to the trough. The apparatus may include a wrapping mechanism that is configured to wrap the napkin around the utensils to define a wrapped bundle. A discharge mechanism may also be provided to remove the wrapped bundle from the wrapping mechanism. For example, the discharge mechanism may remove the wrapped bundle when moving from a first position to a second position. For example, the discharge mechanism may travel between the first position and the second position along an axis that is substantially parallel to a longitudinal axis of the wrapping mechanism. Embodiments are contemplated in which the discharge mechanism moves linearly between the first position and the second position.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF DRAWINGS

The present disclosure will be described hereafter with reference to the attached drawings which are given as non-limiting examples only, in which.

Figure 1:
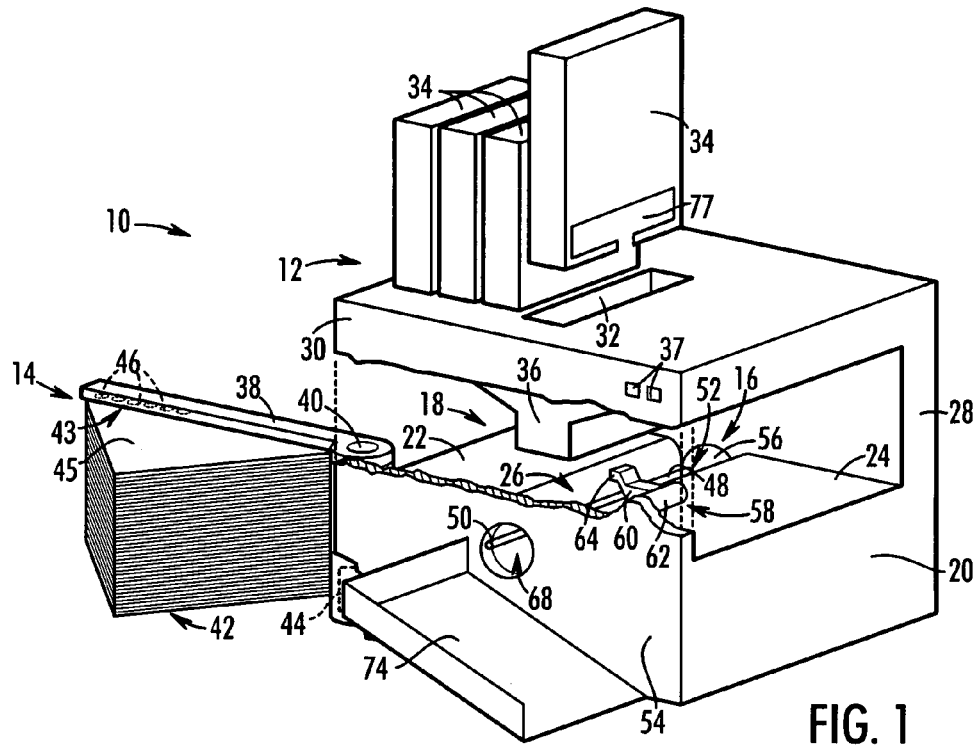
FIG. 1 is a utensil wrapping apparatus in an initial position according to one aspect of the present invention.

Corresponding reference characters indicate corresponding parts throughout the several views. The components in the Figures are not necessarily to scale, emphasis instead being placed upon illustrating the principles of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

FIGS. 1-4 show an exemplary embodiment of an apparatus 10 for wrapping a napkin around one or more utensils in an automated fashion. The term "napkin" is intended to be interpreted broadly to include any sheet of flexible material, such as a sheet of cloth or paper. It should be appreciated that the napkin could have various shapes, such as triangular, rectangular, oval or other shape. The term "utensil" is likewise intended to be broadly interpreted to include any eating instrument, such as a spoon, fork, knife or chopstick. One skilled in the art should appreciate that a utensil may be formed from metal, wood, plastic or other materials. The automated nature of the apparatus 10 greatly increases the speed with which the utensils can be wrapped. Embodiments are contemplated in which a wrapped bundle is formed approximately every 10-15 seconds. The apparatus also reduces the need for human contact of the utensils, which reduces the potential for contamination.

In the example embodiment shown in FIGS. 1-4, the apparatus 10 includes a utensil dispenser 12, a napkin delivery mechanism 14, and a wrapping mechanism 16. These subsystems 12, 14 and 16 may cooperate to wrap a napkin around one or more utensils. For example, the utensil dispenser 12 and the napkin delivery mechanism 14 may deliver utensil(s) and a napkin, respectively, to a wrapping area 18. The wrapping mechanism 16 may then wrap the napkin around the utensil(s).

In some embodiments, the cooperation between the utensil dispenser 12, napkin delivery mechanism 14, and wrapping mechanism 16 may be controlled by an electrical control system and/or mechanical linkage. In some embodiments, for example, a timing belt (not shown) may coordinate the relative timing of the utensil dispenser 12, napkin delivery mechanism 14, and/or wrapping mechanism 16. Embodiments are also contemplated in which a microprocessor (or other hardware/software logic) may coordinate the actions of the utensil dispenser 12, napkin delivery mechanism 14, and/or wrapping mechanism. For example, a microprocessor (not shown) may control the utensil dispenser 12 and napkin delivery mechanism 14 so that a napkin is delivered to the wrapping area 18 prior to utensil (s). By way of another example, a microprocessor may control the wrapping mechanism 16 to start wrapping after a napkin and utensil(s) have been delivered to the wrapping area 18.

In the example shown in FIGS. 1-4, the wrapping area 18 is a surface on a base housing 20 of the apparatus 10. As shown, the wrapping area 18 includes a first portion 22 and a second portion 24. In this example, a trough 26 is formed between the first and second portions 22, 24 of the wrapping area 18. Preferably, the trough 26 is dimensioned to receive one or more utensils.

One skilled in the art should appreciate that the utensil dispenser 12 could deliver utensils to the trough 26 using various devices, such as a conveyor system, robotic fingers, or other devices. In some embodiments, such as the embodiment shown in FIGS. 1-4 and 8-10, the utensil dispenser 12 may be suspended above the trough 26 so that utensils may be gravity fed to the trough 26. For example, the utensil dispenser 12 may be suspended above the trough 26 via a housing portion 28. In such embodiments, an optional chute 36 may be provided to guide the utensils into the trough 26.

In the embodiment shown, the utensil dispenser 12 comprises a dispenser housing 30 with a magazine port 32 dimensioned to receive a magazine 34. The magazine 34 is preferably dimensioned to carry a stack of utensils to be delivered to the trough 26. Embodiments are also contemplated in which the magazine 34 carries multiple stacks of utensils. Although four magazines are shown for purposes of example, fewer or more magazines may be provided depending on the particular circumstances. Likewise, the utensil dispenser 12 may have less than or more than four magazine ports 32. If a user desired to wrap a spoon, knife and two forks, for example, four magazines could be used, a magazine with a stack of spoons, a magazine with a stack of knives and two magazines with stacks of forks. If the user desired to remove one of the forks from the wrap, one of the magazines with forks could be removed from the utensil dispenser 12.

In some embodiments, the apparatus 10 may include a user interface 37, such as buttons, knobs, or slides, that allows the user to power on/off the apparatus 10, change various functions and/or obtain information associated with the apparatus 10. Although the example shown in FIGS. 1-4 shows the user interface 37 on the dispenser housing 30, it should be appreciated that the user interface 37 may be positioned on any portion of the apparatus 10 or be transmitted from a remote location.

In the example shown, the napkin delivery mechanism 14 includes a transfer arm 38 that rotates about a pivot point 40 between a position proximate to a stack of napkins 42 and a position proximate to the trough 26. Embodiments are contemplated in which the napkin delivery mechanism 14 may deliver napkins using linear movement rather than a rotational movement. The transfer arm 38 may include grippers, robotic fingers, or other mechanisms for removing the top napkin 45 from the stack 42. In the example shown, the transfer arm 38 includes a vacuum lifting portion 43 that draws the top napkin 45 from the stack using negative pressure. For example, the transfer arm 38 may include a plurality of holes 46 that are in fluid communication with a vacuum 44. A controller (not shown) may be provided to activate/deactivate the vacuum 44 at the appropriate positions of the transfer arm 38. For example, the vacuum 44 may be activated when the transfer arm 38 is proximate the stack of napkins 42 to pick up the top napkin 45 on the stack 42. After the transfer arm 38 rotates proximate the trough 26, the vacuum 44 may be deactivated to drop the napkin 45 on the trough 26.

In some embodiments, the stack of napkins 42 may be positioned within the base housing 20. For example, a napkin cartridge (not shown) may be provided that is received within the base housing 20. The napkin delivery mechanism 14 may use rotational and/or linear movement of an actuator to deliver napkins to the wrapping area 24. For example, the napkin delivery mechanism 14 may be similar to the paper movement actuator of a computer printer. In some such embodiments, the wrapping area 24 may have a slot through which the paper in the napkin cartridge (not shown) may pass.

Embodiments are also contemplated in which napkins may be delivered to the trough from a roll of napkins, rather than from a stack. In such embodiments, one skilled in the art should appreciate that various mechanisms could be used to separate a sheet from the roll of napkins and deliver the separated sheet to the trough 26.

In some cases, a cover (not shown) may be provided to cover the napkins from an external environment. In some such embodiments, the cover may include an access port through which the transfer arm 38 may be received. Embodiments are also contemplated in which the cover may be detached from the apparatus 10.

An exemplary embodiment of the wrapping mechanism 16 is shown that includes a rod portion 48 with a first end 50 and a second end 52. As shown, the first end 50 is proximate to an end plate 54, while the second end is operatively coupled to an actuator 56. The actuator 56 may be operably connected to a device that provides rotational movement, such as the output shaft of a motor (not shown). In some embodiments, the actuator 56 may rotate at approximately 30 rotations per minute. The rotation of the rod portion 48 wraps the napkin 45 around the utensil(s), as described below with respect to FIGS. 12-16. Although a single rod portion 48 is shown for purposes of example, embodiments are also contemplated in which the wrapping mechanism 16 includes multiple rod portions 48 extending from the actuator 56. The example rod portion 48 shown is cylindrically shaped; however, it should be appreciated that the rod portion 48 could have a cross-section that is oval, rectangular, L-shaped or other shapes. In embodiments with multiple rod portions 48, connection elements could be used to provide structure between the rod portions 48. In some embodiments, the rod portion 48 may be ⅛ inch in diameter. Embodiments are also contemplated with a rod portion 48 of other sizes, both greater than and less than ⅛ inch.

In some embodiments, the apparatus 10 may include a tension mechanism 58 to limit movement of the napkin 45 during wrapping. By limiting movement of the napkin 45 during wrapping, a tighter wrap may be achieved. For example, the tension mechanism 58 may frictionally engage a portion of the napkin 45. If the tension mechanism 58 frictionally engages an end of a napkin, for example, the other end of the napkin would be free for wrapping purposes. In the example shown, the tension mechanism 58 moves into engagement with the napkin 45 proximate the second portion 24 of the wrapping area 18, which leaves the end of the napkin 45 proximate the wrapping area's 18 first portion 22 free for wrapping.

Figure 18:
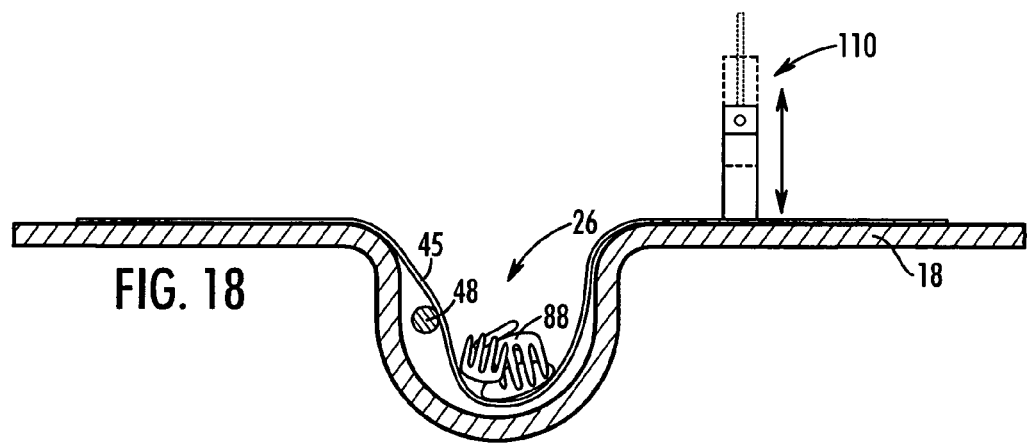
FIG. 18 is the cross-sectional view of the wrapping apparatus shown in FIG. 12 according to another embodiment in which the tension mechanism moves in a linear fashion.

In some embodiments, the tension mechanism 58 includes an arm 60 that rotates about a pivot point 62. The arm 60 has an end 64 that frictionally engages a portion of the napkin 45 when the arm 60 moves into engagement. Although tension mechanism 58 is shown mounted on the end plate 54 for purposes of example, it should be appreciated that the tension mechanism 58 could be mounted to other portions of the apparatus 10 while still engaging a portion of the napkin 45. For example, the tension mechanism 58 could be mounted to the housing portion 28. Embodiments are also contemplated in which the tension mechanism 58 moves linearly into engagement with the napkin 45, such as a piston, as shown in FIG. 18. Any mechanism that could selectively apply frictional engagement to a portion of the napkin 45 during wrapping, such as a gripping mechanism, a tacky surface on the wrapping area 18, a roller with frictional control ability, or a wrapping area with dissimilar material frictional enhancement, would be suitable and are contemplated as alternative tension mechanisms herein. It should also be appreciated that the apparatus 10 may include multiple tension mechanisms 58 in some embodiments.

Figure 4:
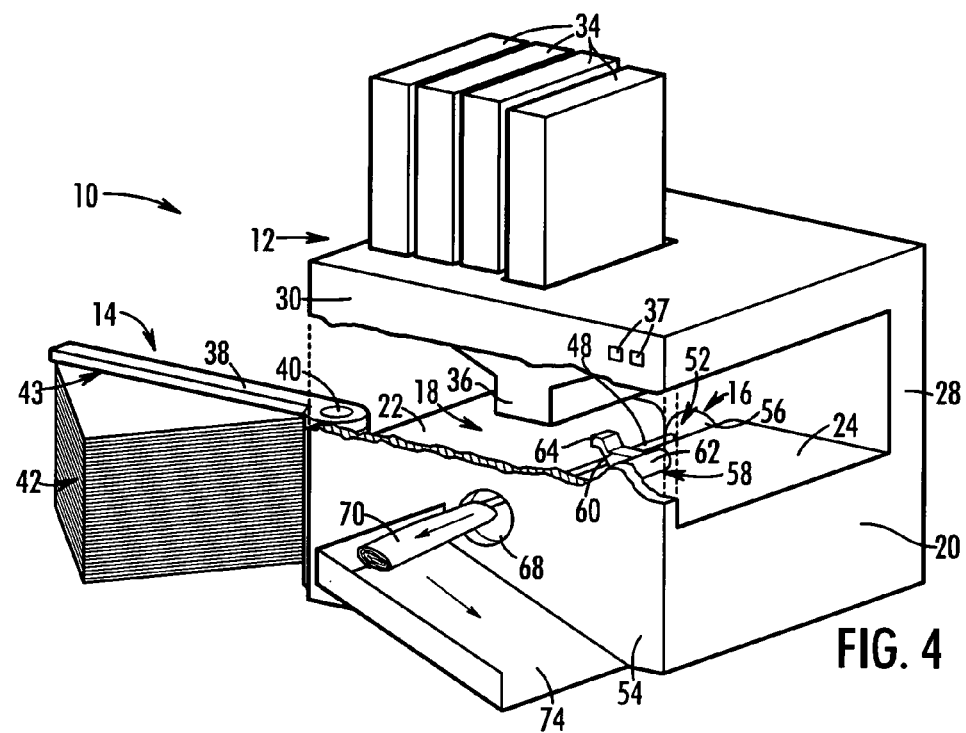
FIG. 4 is the apparatus of FIG. 1 upon discharge of the wrapped bundle.

A discharge mechanism 66 (see FIG. 19) may be provided to remove the wrapped bundle 70 from the wrapping mechanism 16 after completion of wrapping, such as shown in FIG. 4. In some embodiments, the discharge mechanism 66 may move along the longitudinal axis of the rod portion 48 to eject the wrapped bundle through a discharge port 68 defined in the end plate 54.

The operation of the example apparatus 10 shown in FIGS. 1-4 will now be discussed. FIG. 1 shows the initial state of the apparatus 10, prior to delivery of the top napkin 45 from the stack 42 to the trough 26. In the initial state, the tension mechanism 58 is preferably out of engagement with the wrapping area 18. The transfer arm 38 may be adjacent the top napkin 45 on the stack 42, but the vacuum 44 (or other lifting mechanism) may not necessarily be activated yet.

Figure 2:
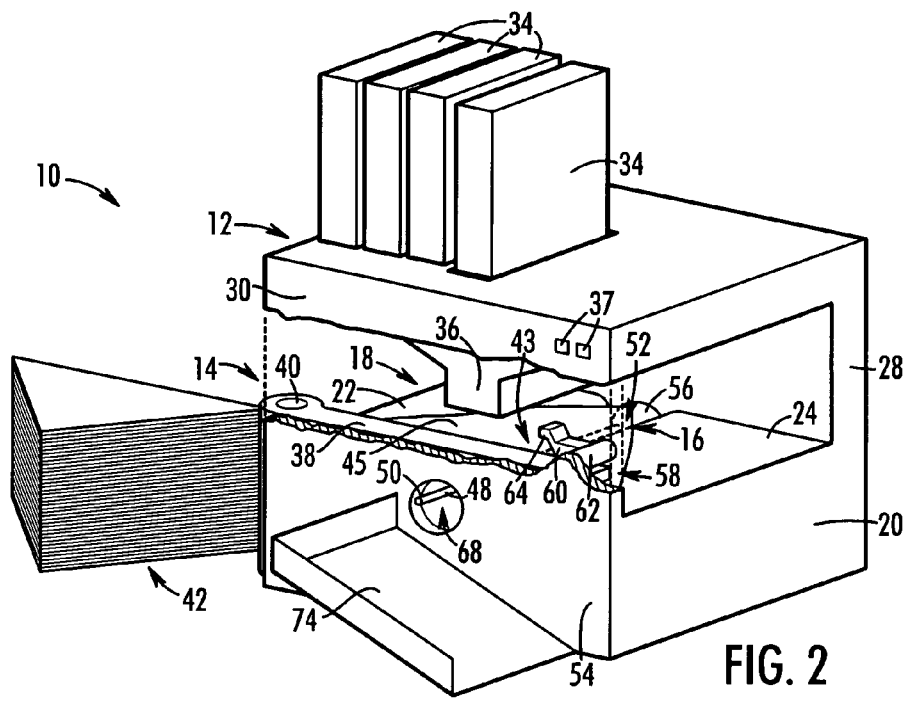
FIG. 2 is the apparatus of FIG. 1 after delivery of a napkin to the wrapping area.

FIG. 2 shows the delivery of the top napkin 45 in the stack 42 to the wrapping area 18. Preferably, the napkin 45 is delivered to a position approximately centered over the trough 26 and adjacent the end plate 54. In the example shown, the transfer arm 38 lifts the top napkin 45 from the stack 42 using the vacuum lifting portion 43 of the transfer arm 38. The negative pressure of the vacuum lifting portion 43 allows the transfer arm 38 to carry the napkin 45 while rotating proximate to the trough 26. Upon reaching an area proximate the trough 26, such as the position of the transfer arm 38 shown in FIG. 2, the apparatus 10 may deactivate the vacuum 44 to drop the napkin 45 onto the trough 26. After the napkin 45 has been delivered to the trough 26 by the transfer arm 38, the transfer arm 38 may rotate back to the initial position proximate the stack of napkins 42.

Figure 3:
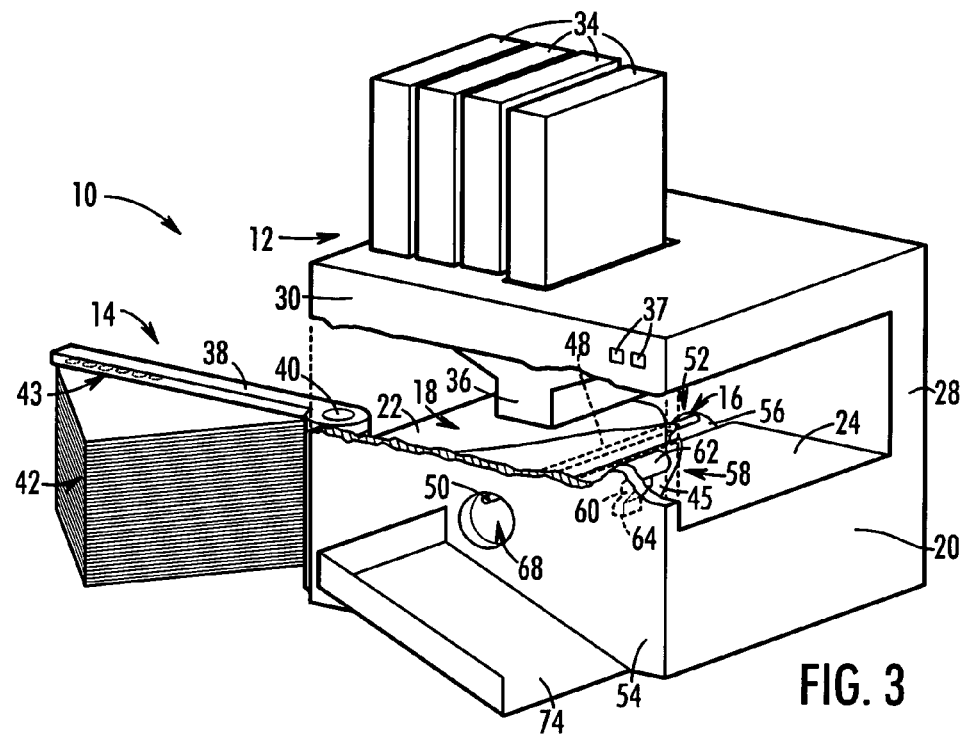
FIG. 3 is the apparatus of FIG. 1 after delivery of utensil(s) to the trough.

FIG. 3 shows the apparatus 10 after the utensil dispenser 12 has delivered one or more utensils into the trough 26. To limit movement of the napkin 45 during wrapping, the tension mechanism 58 moves into engagement with a portion of the napkin 45. Once the utensil(s) have been delivered to the trough 26, the wrapping mechanism 16 may wrap the napkin 45 around the utensil(s). Preferably, at some point during the wrapping operation, the tension mechanism 58 disengages the napkin 45, as described below.

Figure 19:
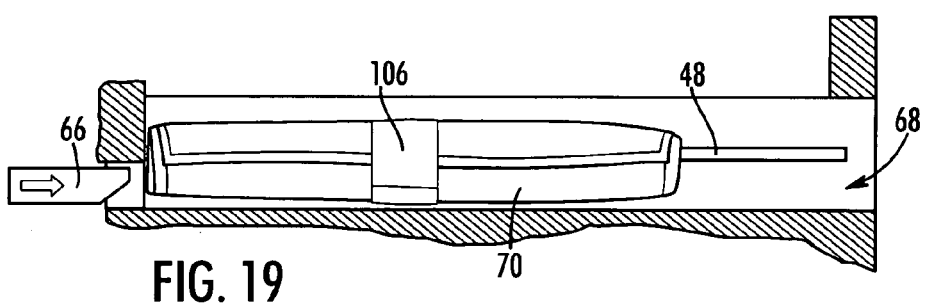
FIG. 19 is the cross-sectional view of the wrapping apparatus along the trough to show ejection of the wrapped bundle.

FIG. 4 shows the ejection of the wrapped bundle 70 through the discharge port 68 by the discharge mechanism 66 (see FIG. 19). In the example shown in FIG. 4, the wrapped bundle 70 may roll or otherwise be conveyed to another position using an exit ramp 74. It should be appreciated, however, that other devices for conveying the wrapped bundle 70 to another location may be provided, such as a conveyor belt, robotic arms, or another type of conveyor mechanism.

Figure 5:
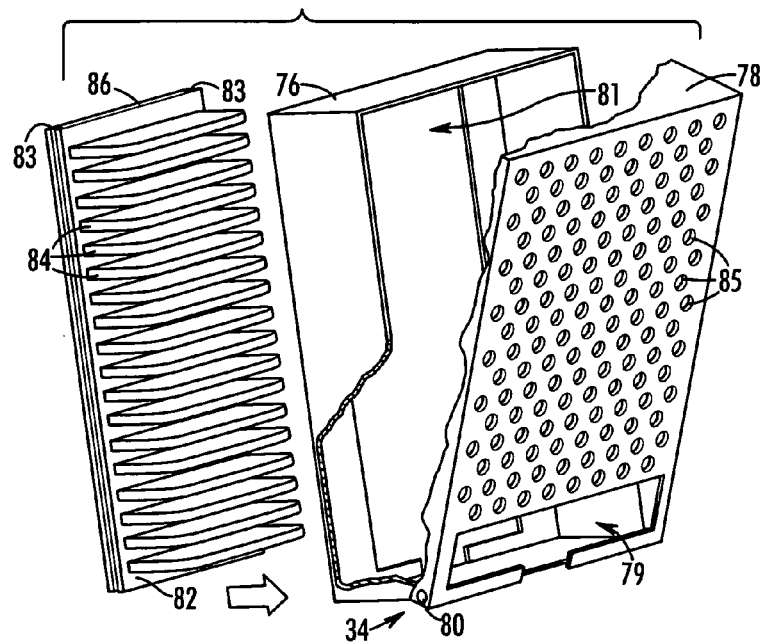
FIG. 5 is an exploded view of an example magazine and separation device that could be used with a utensil wrapping apparatus in which a portion of the magazine has been cut-away.
Figure 6:
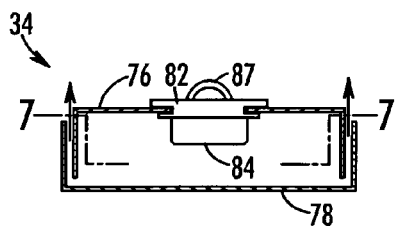
FIG. 6 is a side cross-sectional view of the assembled magazine and separation device shown in FIG. 5.
Figure 7:
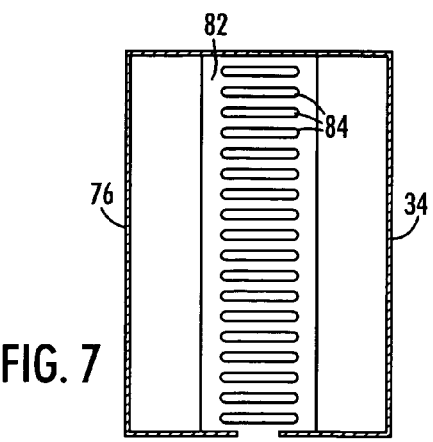
FIG. 7 is a cross-sectional view of the example magazine and separation device shown in FIG. 6 along line 7-7.

FIGS. 5, 6 and 7 show an example embodiment of the magazine 34. Preferably, the magazine 34 is dimensioned to receive a stack of utensils. In the embodiment shown, the magazine 34 includes a container portion 76 that is pivotably connected to a lid portion 78 using a hinge 80. In some cases, the container portion 76 and/or the lid portion 78 may include a slot 79 to eject a utensil from the magazine 34 using an ejection mechanism, such as that described below with respect to FIGS. 8-10. In some embodiments, both container portion 76 and the lid portion 78 may include axially aligned slots. In some embodiments, such as that shown in FIG. 5, the magazine 34 may include a liquid penetrable area. As shown, for example, the liquid penetrable area is formed by a plurality of holes 85.

In some embodiments, a separation device 82 may be received by an opening 81 in the container portion 76. The separation device 82 may be used to space apart the utensils during cleaning. Although the separation device 82 includes slots 83 in the example shown to form an interference fit with the container portion 76 of the magazine 34, it should be appreciated that the separation device 82 may be connected to the magazine 34 using a frictional fit or other type of connection.

In some embodiments, the separation device 82 may include a plurality of projections 84 that extend from a base 86 into the interior of the magazine 34. The spaces between each projection 84 are preferably dimensioned to receive a utensil. In some cases, the projections 84 may be configured to receive utensils using a fictional fit, interference fit or other connection. For example, embodiments are contemplated in which the separation device 82 may be formed from a material that frictionally engages the utensils, such as silicon rubber, to hold the utensils in place. Although projections 84 are shown for purposes of example, it should be appreciated that the separation device 82 could have other configurations to divide the interior of the magazine 34.

The separation device 82 may be removed from the magazine 34 to remove spacing between the utensils. In some cases, the base 86 may include a handle or extension 87 that may be used to remove the separation device 82 from the magazine 34. It should be appreciated that other structures could be used to ease grasping of the separation device 82. In the example shown in FIG. 6, the handle 87 is positioned external to the interior of the magazine 34.

Figure 8:
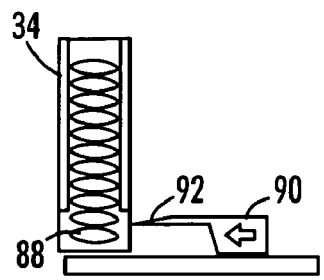
FIG. 8 is a side cross-sectional view of an example utensil dispenser with an ejector in an initial position.
Figure 8:
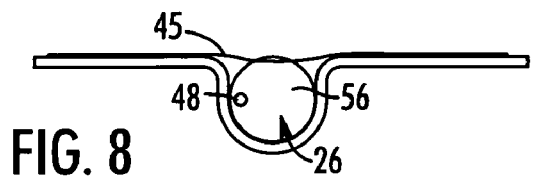
Figure 9:
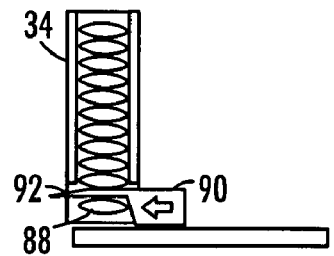
FIG. 9 is the utensil dispenser of FIG. 8 in which the ejector has moved to engage the stack of utensils.
Figure 9:
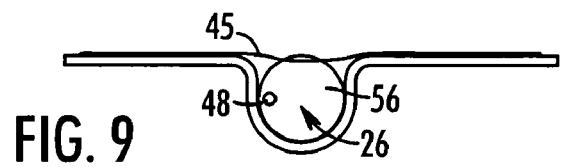
Figure 10:
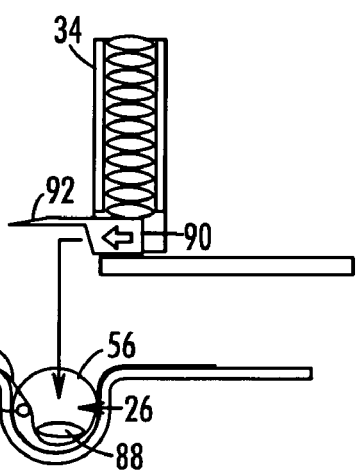
FIG. 10 is the utensil dispenser of FIG. 8 in which the ejector has moved to eject the bottom utensil from the stack of utensils.

FIGS. 8-10 show an example embodiment for the utensil dispenser 12. In this example, the utensil dispenser 12 includes an ejector 90 that is movable to eject a utensil from the magazine 34 to the trough 26. In embodiments where the magazine 34, such as that shown in FIG. 5, the ejector 90 may be received through the slot 79 and the opening 81. As shown, the ejector 90 includes a tapered portion 92 that is configured to separate a bottom utensil 88 in the stack within the magazine 34. As shown in FIG. 9, for example, the tapered portion 92 may be capable of separating the bottom utensil 88 from the stack of utensils. As the ejector 90 continues movement, as shown in FIG. 10, the ejector 90 moves the separated utensil 88 from the stack. This may cause the separated utensil 88 to drop via gravity force into the trough 26. In some embodiments, an ejector 90 may be associated with each magazine 34 in the utensil dispenser 12.

Figure 11:
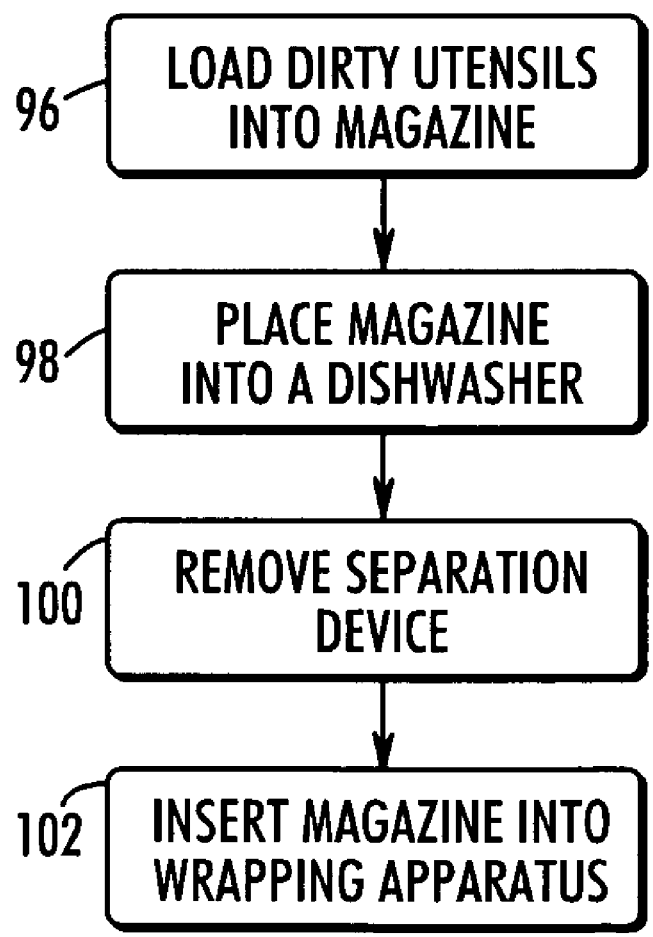
FIG. 11 is a flow chart of an example method for loading utensils into a utensil wrapping apparatus.
Figure 12:
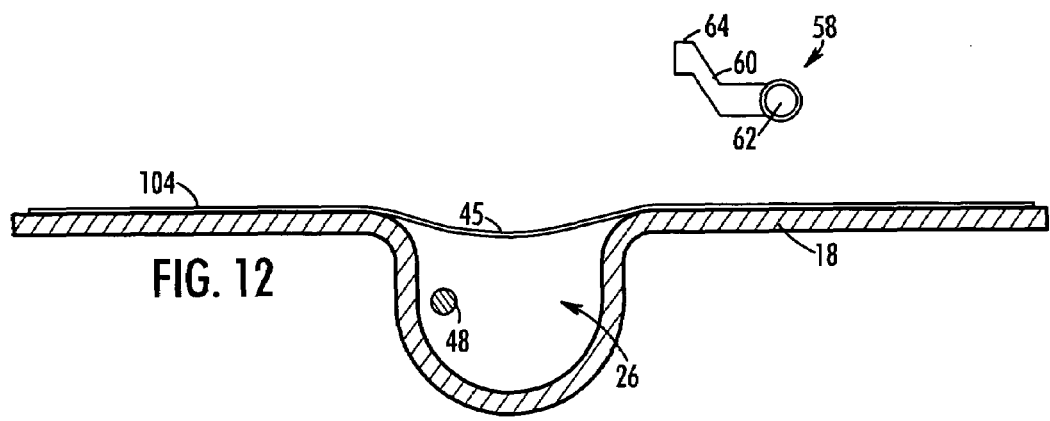
FIG. 12 is a cross-sectional view of the wrapping apparatus showing an example wrapping mechanism in which a napkin has been delivered to the wrapping area.

FIG. 11 describes an example method for loading utensils into the apparatus 10, without touching the utensils after cleaning. The user may load a plurality of dirty utensils into a magazine, as indicated by reference number 96. This method contemplates a magazine 34 that allows liquid penetration into the interior of the magazine 34 for cleaning purposes, such as the example magazine 34 shown in FIG. 5. The magazine 34 may then be placed into a dishwasher (or other cleaning apparatus) to clean the utensils within the magazine 34, as indicated by reference number 98. In some embodiments, the magazine 34 may be associated with a separation device 82 to space apart the utensils for increased cleaning efficiency. For such embodiments, the separation device 82 may be removed after cleaning, as indicated in reference number 100. The magazine 34 may then be inserted into the apparatus 10, as indicated by reference number 102.

FIGS. 12-18 show the operation of the wrapping mechanism 16 according to one exemplary embodiment. In the example shown, the wrapping mechanism 16 comprises a rod portion 48 that rotates in conjunction with an actuator 56 (see FIGS. 1-4). The rod portion 48 is in an initial position in the example shown in FIG. 12, with the napkin 45 draped over the trough 26.

Figure 13:
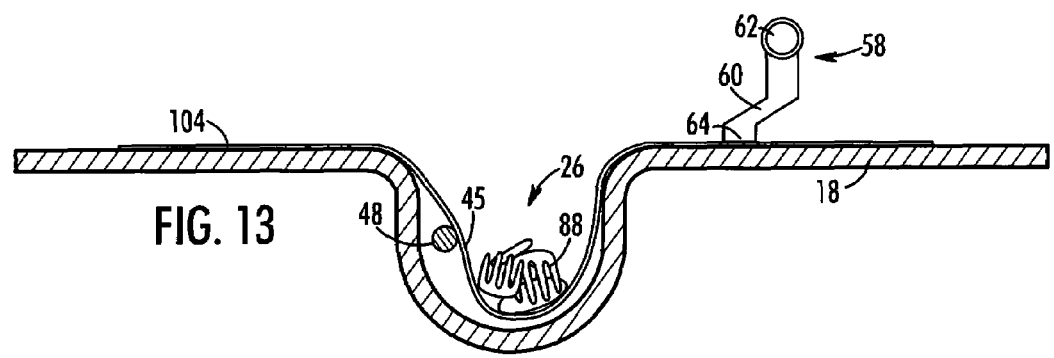
FIG. 13 is the cross-sectional view of the wrapping apparatus shown in FIG. 12 in which utensils have been delivered to the wrapping area.

FIG. 13 shows utensils 88 delivered to the trough on top of the napkin 45. Although multiple utensils are shown in this example, it should be appreciated that a single utensil may be wrapped if desired. In the example shown in FIG. 13, the tension mechanism 58 has moved to engage a portion of the napkin 45. This frictional engagement between the end 64 of the tension mechanism 58 and the napkin 45, limits movement of the portion of napkin. As shown, for example, the napkin 45 is trapped between the end 64 of the tension mechanism 58 and the wrapping area 18.

Figure 14:
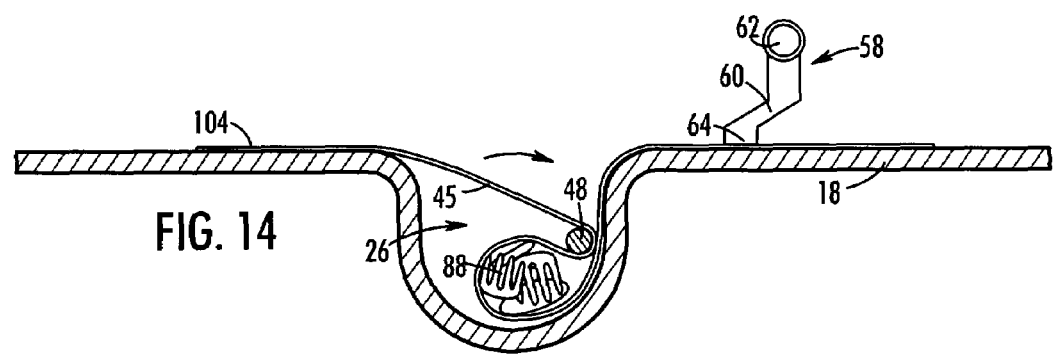
FIG. 14 is the cross-sectional view of the wrapping apparatus shown in FIG. 12 in which the wrapping mechanism has started initial rotation.

FIG. 14 shows the initial rotation of the rod portion 48 to engage a portion of the napkin 45. Although the example shows a clockwise rotation of the rod portion 48, it should be appreciated that the rod portion 48 could rotate in a counter-clockwise direction. In such embodiments, the tension mechanism 58 would be positioned on the opposite side of the trough 26 that is shown in FIG. 14. As shown, the napkin 45 has a free end 104 that moves when the rod portion 48 engages the napkin 45. The opposite end of the napkin 45 has limited movement due to the tension mechanism 58. The frictional engagement of the napkin 45 by the tension mechanism 58 allows a tight wrap of the napkin 45 around the utensils 88.

Figure 15:
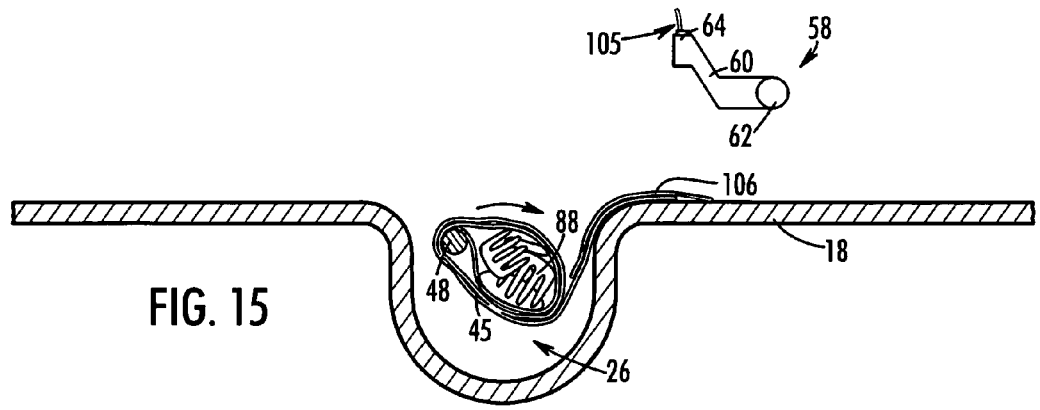
FIG. 15 is the cross-sectional view of the wrapping apparatus shown in FIG. 12 in which the wrapping mechanism has continued to rotate and a piece of tape has been placed in the bundle.

FIG. 15 shows the continued rotation of the rod portion 48 to continue wrapping the napkin 45 around the utensils 88. In this example, the tension mechanism 58 includes a tape dispenser 105 that has placed a piece of tape 106 on the napkin 45 to aid in maintaining a tight wrap. The term "tape" is intended to be broadly interpreted to include paper, film, and other flexible materials on which a portion of a surface includes an adhesive material. The adhesive material may cover an entire surface of the paper, film, or other material in some cases; however, embodiments are also contemplated in which the adhesive covers selected portions of the surface. FIG. 15 also shows that the tension mechanism 58 has moved away from the napkin 45 to disengage the frictional engagement of the napkin 45.

Figure 16:
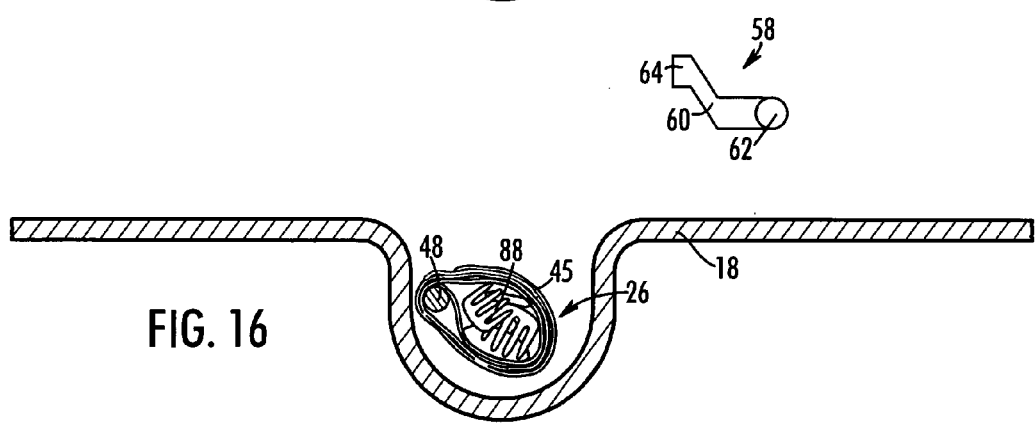
FIG. 16 is the cross-sectional view of the wrapping apparatus shown in FIG. 12 in which the wrapping mechanism has continued rotation.

FIG. 16 shows the completion of the wrapping operation. In the example shown, the rod portion 48 has returned to the initial position of FIG. 12. It should be appreciated, however, that the rod portion 48 need not necessarily return to the initial position.

Figure 17:
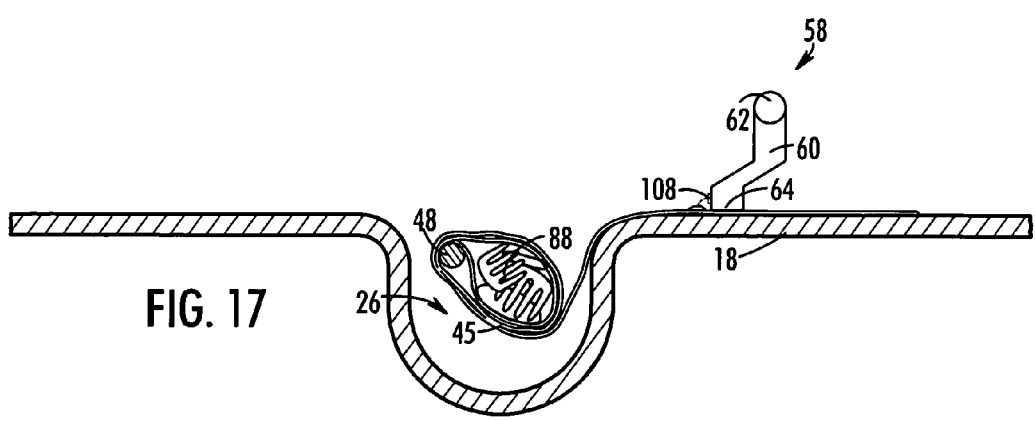
FIG. 17 is the cross-sectional view of the wrapping apparatus shown in FIG. 12 according to another embodiment in which the tension mechanism includes an adhesive dispenser.

FIG. 17 shows an alternative embodiment in which the tension mechanism 58 includes an adhesive dispenser 108 that is configured to deposit an adhesive on the napkin 45. An adhesive reservoir (not shown) may be in fluid communication with the adhesive dispenser 108. In some cases, the adhesive may be deposited during the wrapping process. For example, the adhesive dispenser 108 may deposit adhesive while the tension mechanism 58 engages a portion of the napkin 45. Embodiments are also contemplated in which the adhesive dispenser 108 is not integrated in the tension mechanism 58, but may be a separate mechanism carried on the apparatus 10.

FIG. 18 shows an alternative embodiment of the tension mechanism 110. In this embodiment, the tension mechanism 110 moves linearly between a first position, frictionally engaging a portion of the napkin 45, and a second position away from the napkin 45. For example, the tension mechanism 110 may be a piston. In some such embodiments, the tension mechanism 110 may be pneumatically or hydraulically actuated. It should be appreciated, however, that other mechanisms may be used that move linearly between the first position engaging the napkin 45 and a second position away from the napkin 45.

FIG. 19 shows an example embodiment with a discharge mechanism 66 that travels along an axis approximately parallel with the longitudinal axis of the wrapping mechanism 16. This allows the wrapped bundle to be ejected longitudinally out of the trough 26. In the example shown, the discharge mechanism 66 is positioned below the rod portion 48 of the wrapping mechanism 16. In some such embodiments, the trough 26 may include a longitudinal channel (not shown) dimensioned to receive at least a portion of the discharge mechanism 66. Embodiments are also contemplated in which the discharge mechanism 66 may be positioned above the rod portion 48. In the example shown, the wrapped bundle 70 includes an optional band 106 around the bundle 70.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An apparatus for wrapping a napkin around one or more utensils, said apparatus comprising:
a wrapping area defining a trough dimensioned to receive one or more utensils;
a utensil dispenser configured to deliver one or more utensils to said trough;
a napkin delivery mechanism configured to deliver a napkin to said trough;
a wrapping mechanism configured to wrap the napkin around the one or more utensils to define a wrapped bundle;
a tension mechanism configured to selectively limit movement of the napkin during wrapping of the napkin around the one or more utensils;
wherein said tension mechanism is configured to frictionally engage a portion of the napkin proximate an edge of said trough prior to said wrapping mechanism starting to wrap the napkin around the one or more utensils; and
wherein said tension mechanism is configured to stop frictional engagement of the napkin at some time after said wrapping mechanism starts wrapping the napkin, but before said wrapping mechanism completes wrapping of the napkin.

2. The apparatus of claim 1, wherein said tension mechanism is movable between a first position and a second position, wherein said tension mechanism limits movement of the napkin in said first position and wherein said tension mechanism does not limit movement of the napkin in said second position.

3. The apparatus of claim 2, wherein said tension mechanism rotates between said first position and said second position.

4. The apparatus of claim 2, wherein said tension mechanism moves linearly between said first position and said second position.

5. The apparatus of claim 4, wherein said tension mechanism is a piston.

6. The apparatus of claim 2, wherein said tension mechanism is adjacent said wrapping area in said first position.

7. The apparatus of claim 2, wherein movement of said tension mechanism is synchronized with said wrapping mechanism such that said tension mechanism moves to said first position prior to said wrapping mechanism starting to wrap the napkin around the one or more utensils.

8. The apparatus of claim 2, wherein said tension mechanism traps a portion of the napkin between said tension mechanism and said wrapping area in said first position.

9. The apparatus of claim 2, wherein said tension mechanism includes an adhesive dispenser configured to deposit an adhesive on the napkin.

10. The apparatus of claim 9, wherein said tension mechanism is configured to deposit the adhesive on the napkin when said tension mechanism is in said first position.

11. The apparatus of claim 2, wherein said tension mechanism includes a tape dispenser configured to place a piece of tape on the napkin.

12. The apparatus of claim 11, wherein said tension mechanism is configured to place the piece of tape on the napkin when said tension mechanism is in said first position.

13. The apparatus of claim 1, wherein said wrapping mechanism includes a rod portion that extends into said trough.

14. The apparatus of claim 13, wherein said wrapping mechanism includes an actuator configured to rotate said rod portion substantially about an axis of said trough.

15. The apparatus of claim 14, wherein said rod portion is approximately longitudinally aligned with said trough.

16. The apparatus of claim 15, wherein said rod portion is approximately ⅛ inch in diameter.

17. The apparatus of claim 1, further comprising a discharge mechanism configured to remove the wrapped bundle from said wrapping mechanism when said discharge mechanism moves from a first position to a second position.

18. The apparatus of claim 17, wherein said discharge mechanism travels between said first position and said second position along an axis that is substantially parallel to a longitudinal axis of said wrapping mechanism.

19. The apparatus of claim 1, wherein said napkin delivery mechanism includes a transfer arm configured to rotate between a first position proximate a stack of napkins and a second position proximate said trough.

20. The apparatus of claim 19, wherein said transfer arm includes a vacuum lifting portion configured to lift a napkin from the stack of napkins.

21. The apparatus of claim 1, wherein said utensil dispenser includes a magazine with an interior dimensioned to receive a stack of utensils.

22. The apparatus of claim 21, wherein said magazine is selectively detachable from said utensil dispenser.

23. The apparatus of claim 21, wherein said magazine includes a liquid penetrable area that allows liquid communication with said interior along substantially the entire length of said magazine.

24. The apparatus of claim 21, further comprising a separation device configured to be carried by said magazine, wherein said separation device defines a plurality of spaces in said interior that are each dimensioned to receive a utensil.

25. The apparatus of claim 24, wherein said separation device is selectively removable from said magazine.

26. The apparatus of claim 25, wherein said separation device includes a first portion external to said interior of said magazine and a second portion that extends into said interior of said magazine.

27. An apparatus for wrapping a napkin around one or more utensils, said apparatus comprising:
- a wrapping area defining a trough dimensioned to receive one or more utensils;
- a utensil dispenser configured to deliver one or more utensils to said trough;
- a napkin delivery mechanism configured to deliver a napkin to said trough;
- a wrapping mechanism configured to wrap the napkin around the one or more utensils to define a wrapped bundle;
- means for frictionally engaging a portion of the napkin to selectively limit movement of the napkin when said wrapping mechanism is wrapping the napkin around the one or more utensils;
- wherein said frictionally engaging means is synchronized with said wrapping mechanism such that said frictionally engaging means engages the napkin prior to said wrapping mechanism starting to wrap the napkin; and
- wherein said frictionally engaging means disengages the napkin at some time after said wrapping mechanism starts wrapping the napkin, but before said wrapping mechanism completes wrapping of the napkin.

28. The apparatus of claim 27, wherein said frictionally engaging means includes a tape dispenser configured to place a piece of tape on the napkin, wherein said napkin delivery mechanism includes a transfer arm that rotates between a first position proximate a stack of napkins and a second position proximate said trough and wherein said transfer arm includes a vacuum lifting portion configured to lift a napkin from the stack of napkins.

29. The apparatus of claim 28, wherein said utensil dispenser includes a magazine with an interior dimensioned to receive a stack of utensils, said apparatus further comprising a separation device configured to be carried by said magazine, wherein said separation device divides said interior into a plurality of spaces that are each dimensioned to receive a utensil and wherein said separation device is selectively removable from said magazine.

30. The apparatus of claim 29, wherein said magazine includes a liquid penetrable portion to allow liquid communication with said interior, wherein said liquid penetrable portion is configured to allow sufficient liquid communication with said interior to clean utensils carried therein.

31. An apparatus for wrapping a napkin around one or more utensils, said apparatus comprising:
- a wrapping area defining a trough dimensioned to receive one or more utensils;
- a utensil dispenser configured to deliver one or more utensils to said trough;
- a transfer arm configured to deliver a napkin to said trough, wherein said transfer arm rotates between a first position proximate a stack of napkins and a second position proximate said trough;
- a wrapping mechanism configured to wrap the napkin around the one or more utensils;
- a tension mechanism configured to selectively limit movement of the napkin during wrapping of the napkin around the one or more utensils;
- wherein said tension mechanism is movable between a first position that limits movement of the napkin and a second position that does not limit movement of the napkin;
- wherein movement of said tension mechanism is synchronized with said wrapping mechanism such that said tension mechanism moves to said first position prior to said wrapping mechanism starting to wrap the napkin around the one or more utensils; and
- wherein said tension mechanism moves to said second position at some time after said wrapping mechanism starts wrapping the napkin, but before said wrapping mechanism completes wrapping of the napkin.

32. The apparatus of claim 31, wherein said transfer arm includes a vacuum lifting portion configured to lift a napkin from the stack of napkins.

33. The apparatus of claim 32, wherein said transfer arm rotates about an approximately perpendicular axis to a longitudinal axis of said trough.

34. The apparatus of claim 32, wherein said transfer arm rotates about an approximately vertical axis.

35. The apparatus of claim 32, wherein said transfer arm has a limited rotational movement of less than approximately 180 degrees.

36. An apparatus for wrapping a napkin around one or more utensils, said apparatus comprising:
- a wrapping area defining a trough dimensioned to receive one or more utensils;
- a utensil dispenser configured to deliver one or more utensils to said trough;
- a napkin delivery mechanism configured to deliver a napkin to said trough;
- a wrapping mechanism configured to wrap the napkin around the one or more utensils to define a wrapped bundle;

a discharge mechanism configured to remove the wrapped bundle from said wrapping mechanism when said discharge mechanism moves from a first position to a second position;

a tension mechanism configured to selectively limit movement of the napkin during wrapping of the napkin around the one or more utensils;

wherein said tension mechanism is movable between a first position that limits movement of the napkin and a second position that does not limit movement of the napkin;

wherein movement of said tension mechanism is synchronized with said wrapping mechanism such that said tension mechanism moves to said first position prior to said wrapping mechanism starting to wrap the napkin around the one or more utensils; and wherein said tension mechanism moves to said second position at some time after said wrapping mechanism starts wrapping the napkin, but before said wrapping mechanism completes wrapping of the napkin.

37. The apparatus of claim 36, wherein said discharge mechanism travels between said first position and said second position along an axis that is substantially parallel to a longitudinal axis of said wrapping mechanism.

38. The apparatus of claim 37, wherein said discharge mechanism moves linearly between said first position and said second position.

39. An apparatus for wrapping a napkin around one or more utensils, said apparatus comprising:

a wrapping area defining a trough dimensioned to receive one or more utensils;

a utensil dispenser configured to deliver one or more utensils to said trough;

a napkin delivery mechanism configured to deliver a napkin to said trough;

a wrapping mechanism configured to wrap the napkin around the one or more utensils to define a wrapped bundle;

a tension mechanism configured to selectively limit movement of the napkin during wrapping of the napkin around the one or more utensils;

wherein said tension mechanism is movable between a first position that limits movement of the napkin and a second position that does not limit movement of the napkin;

wherein movement of said tension mechanism is synchronized with said wrapping mechanism such that said tension mechanism moves to said first position prior to said wrapping mechanism starting to wrap the napkin around the one or more utensils; and wherein said tension mechanism moves to said second position at some time after said wrapping mechanism starts wrapping the napkin, but before said wrapping mechanism completes wrapping of the napkin.

40. The apparatus of claim 39, wherein said tension mechanism traps a portion of the napkin between said tension mechanism and said wrapping area in said first position.

41. The apparatus of claim 39, wherein said tension mechanism includes an adhesive dispenser configured to deposit an adhesive on the napkin.

42. The apparatus of claim 41, wherein said tension mechanism is configured to deposit the adhesive on the napkin when said tension mechanism is in said first position.

43. An apparatus for wrapping a napkin around one or more utensils, said apparatus comprising:

a wrapping area defining a trough dimensioned to receive one or more utensils;

a utensil dispenser configured to deliver one or more utensils to said trough;

a napkin delivery mechanism configured to deliver a napkin to said trough;

a wrapping mechanism configured to wrap the napkin around the one or more utensils to define a wrapped bundle;

a tension mechanism configured to selectively limit movement of the napkin during wrapping of the napkin around the one or more utensils;

wherein said tension mechanism is movable between a first position that limits movement of the napkin and a second position that does not limit movement of the napkin;

wherein movement of said tension mechanism is synchronized with said wrapping mechanism such that said tension mechanism moves to said first position prior to said wrapping mechanism starting to wrap the napkin around the one or more utensils; and wherein said tension mechanism includes at least one of:
  an adhesive depositing mechanism configured to deposit an adhesive on the napkin, and
  a tape dispenser configured to place a piece of tape on the napkin.

44. The apparatus of claim 43, wherein said adhesive depositing mechanism is configured to deposit the adhesive on the napkin when said tension mechanism is in said first position.

45. The apparatus of claim 43, wherein said tape dispenser is configured to place the piece of tape on the napkin when said tension mechanism is in said first position.

46. The apparatus of claim 43, wherein said wrapping mechanism includes a rod portion that extends into said trough.

47. The apparatus of claim 46, wherein said wrapping mechanism includes an actuator configured to rotate said rod portion substantially about an axis of said trough.

48. The apparatus of claim 47, wherein said rod portion is approximately longitudinally aligned with said trough.

49. The apparatus of claim 43, further comprising a discharge mechanism configured to remove the wrapped bundle from said wrapping mechanism when said discharge mechanism moves from a first position to a second position.

50. The apparatus of claim 49, wherein said discharge mechanism travels between said first position and said second position along an axis that is substantially parallel to a longitudinal axis of said rod portion.

* * * * *